US006761058B2

(12) United States Patent
Yamaguchi et al.

(10) Patent No.: US 6,761,058 B2
(45) Date of Patent: Jul. 13, 2004

(54) LEAKAGE DETERMINATION SYSTEM FOR EVAPORATIVE FUEL PROCESSING SYSTEM

(75) Inventors: Takashi Yamaguchi, Saitama-ken (JP); Takashi Isobe, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/874,036

(22) Filed: Jun. 6, 2001

(65) Prior Publication Data

US 2001/0049958 A1 Dec. 13, 2001

(30) Foreign Application Priority Data

Jun. 8, 2000 (JP) ........................................ 2000-171837
Jun. 8, 2000 (JP) ........................................ 2000-171838

(51) Int. Cl.[7] .................................................. G01M 3/04
(52) U.S. Cl. ..................................... 73/40.5 R; 73/49.7
(58) Field of Search ................................ 73/40, 40.5 R, 73/49.7, 48.1; 123/520; 702/51

(56) References Cited

U.S. PATENT DOCUMENTS 5,069,188 A * 12/1991 Cook .......................... 123/520
5,666,925 A * 9/1997 Denz et al. .................. 123/520
5,699,775 A * 12/1997 Azuma ........................ 123/520
5,750,888 A * 5/1998 Matsumoto et al. ........ 73/118.1
5,957,115 A * 9/1999 Busato et al. ............... 123/520
5,967,124 A * 10/1999 Cook et al. ................. 123/520
6,283,097 B1 * 9/2001 Cook et al. ................. 123/520
2001/0025525 A1 * 10/2001 Isobe et al.
2001/0025630 A1 * 10/2001 Saruwatari et al.

* cited by examiner

*Primary Examiner*—Hezron Williams
*Assistant Examiner*—Charles D. Garber
(74) *Attorney, Agent, or Firm*—Arent Fox PLLC

(57) ABSTRACT

There is provided a leakage determination system for an evaporative fuel processing system, which, even when pressure within the evaporative fuel processing system is temporarily increased e.g. due to an increase in the amount of generation of evaporative fuel in a fuel tank, is capable of performing an accurate leakage determination by eliminating the influence of the temporary rise in the pressure within the evaporative fuel processing system on the leakage determination. A pressure sensor detects pressure within the evaporative fuel processing system. Negative pressure is introduced from the intake system into the evaporative fuel processing system, whereby the pressure within the evaporative fuel processing system is reduced until the detected pressure becomes equal to a predetermined negative pressure. After the pressure reduction, the negative pressure is introduced from the intake system into the evaporative fuel processing system under predetermined conditions. Whether or not there is a leak in the evaporative fuel processing system is determined based on a state of the pressure within the evaporative fuel processing system, which has been detected during the introduction of the negative pressure from the intake system.

4 Claims, 6 Drawing Sheets

LEAKAGE DETERMINATION SYSTEM FOR EVAPORATIVE FUEL PROCESSING SYSTEM

BACKGROUND OF THE INVENTION

1. Field of the Invention

This invention relates to a leakage determination system for an evaporative fuel processing system of an internal combustion engine, for determining whether or not there is a leak in the evaporative fuel processing system which causes a canister to temporarily store evaporative fuel generated from a fuel tank, and supplies the same to an intake system of the engine with proper timing.

2. Description of the Prior Art

Conventionally, a leakage determination system of the above-mentioned kind was proposed e.g. in Japanese Laid-Open Patent Publication (Kokai) No. 9-291854. The evaporative fuel processing system includes a canister, a fuel tank, a charge passage, and a purge passage. The canister is connected to the fuel tank via the charge passage. The charge passage is provided with a pressure sensor that detects pressure within the charge passage (hereinafter referred to as "the tank internal pressure" because the pressure within the charge passage is approximately equal to pressure within the fuel tank in a steady state of the system). In a bypass passage bypassing the charge passage, there is arranged a bypass valve for opening and closing the bypass passage. Further, the canister is connected to an atmosphere passage which is open to the atmosphere, and in the atmosphere passage, there is arranged a vent shut valve for opening and closing the same. In the purge passage, there is arranged a purge control valve for opening and closing the same.

The leakage determination system determines whether or not there is a leak in the evaporative fuel processing system, by carrying out a pressure-reducing mode process and a leakage-checking mode process sequentially as described below. First, in the pressure-reducing mode process, the bypass valve and the purge control valve are opened, and the vent shut valve is closed, whereby the pressure within the evaporative fuel processing system is reduced until the tank internal pressure is lowered to a predetermined negative pressure.

Then, in the leakage-checking mode process, the bypass valve, the purge control valve and the vent shut valve are all closed to maintain the evaporative fuel processing system in a sealed state over a predetermined time period, and in this state, changes in the tank internal pressure are monitored. Through this monitoring, if a change in the tank internal pressure becomes equal to or larger than a predetermined value, it is determined that there is a leak in the system, whereas if the changes in the tank internal pressure are held below the predetermined value, it is determined that there is no leak.

In the above conventional leakage determination system, however, e.g. when the vehicle is jolted with only a small amount of fuel remaining in the fuel tank or when the outside temperature is high, the amount of evaporative fuel within the fuel tank can be increased to raise the tank internal pressure in a short time, which makes it impossible to effect an accurate leakage determination. In short, the leakage-checking mode process is only executed for checking changes in the tank internal pressure within the predetermined time period, and hence if the tank internal pressure is temporarily increased for some reason as mentioned above, it can be erroneously determined that there is a leak, even though there is no leak.

SUMMARY OF THE INVENTION

It is an object of the invention to provide a leakage determination system for an evaporative fuel processing system, which, even when pressure within the evaporative fuel processing system is temporarily increased e.g. due to an increase in the amount of evaporative fuel in a fuel tank, is capable of performing an accurate leakage determination by eliminating the influence of the temporary rise in the pressure within the evaporative fuel processing system.

To attain the above object, according to a first aspect of the invention, there is provided a leakage determination system for an evaporative fuel processing system that causes a canister to absorb evaporative fuel generated from a fuel tank and supplies the evaporative fuel absorbed in the canister to an intake system of an internal combustion engine, the leakage determination system comprising:

pressure detection means for detecting pressure within the evaporative fuel processing system;

pressure reduction means for reducing the pressure within the evaporative fuel processing system until the detected pressure within the evaporative fuel processing system becomes equal to a predetermined negative pressure, by introducing negative pressure from the intake system;

negative pressure introduction means for introducing the negative pressure from the intake system into the evaporative fuel processing system under predetermined conditions after the pressure reduction by the pressure reduction means; and leakage determination means for determining whether or not there is a leak in the evaporative fuel processing system, based on a state of the pressure within the evaporative fuel processing system, which has been detected during the introduction of the negative pressure from the intake system by the negative pressure introduction means.

Preferably, the negative pressure introduction means introduces the negative pressure from the intake system at a predetermined constant negative pressure introduction flow rate.

According to this leakage determination system for an evaporative fuel processing system, in a leakage determination process, first, negative pressure is introduced from the intake system into the evaporative fuel processing system, whereby the pressure within the evaporative fuel processing system is reduced to the predetermined negative pressure. Then, after the pressure reduction is terminated, negative pressure is introduced again from the intake system into the evaporative fuel processing system at the predetermined constant negative pressure introduction flow rate, and whether or not there is a leak in the evaporative fuel processing system is determined based on a pressure within the evaporative fuel processing system, which has been detected during the introduction of the negative pressure at the constant flow rate. According to the first aspect of the invention, since the pressure within the evaporative fuel processing system is detected while introducing the negative pressure as described above, the detected pressure represents an offset between an increment of a pressure increased by leakage and a decrement of the same reduced by the introduction of the negative pressure. Therefore, leakage determination for the evaporative fuel processing system can be carried out based on the pressure within the evaporative fuel processing system.

Further, since the pressure within the evaporative fuel processing system is detected while continuously introducing the negative pressure, even when the pressure within the evaporative fuel processing system is temporarily increased e.g. due to an increase in the amount of evaporative fuel generated in the fuel tank, it is possible to carry out leakage determination while reducing the temporary rise in the pressure. Consequently, the influence of the temporary rise in the pressure caused by other factors than leakage on the leakage determination can be eliminated, which enables accurate determination of whether or not there is a leak in the evaporative fuel processing system.

More preferably, the negative pressure introduction means includes pressure re-reduction means for holding the evaporative fuel processing system in a closed state and introducing the negative pressure from the intake system whenever the pressure within the evaporative fuel processing system rises to a predetermined pressure higher than the predetermined negative pressure, to thereby repeatedly reduce the pressure within the evaporative fuel processing system to a second predetermined negative pressure lower than the predetermined pressure, the leakage determination system further comprising pressure reduction cycle detection means for detecting a pressure reduction cycle of the pressure reduction performed by the pressure re-reduction means, and the leakage determination means determining whether or not there is a leak in the evaporative fuel processing system, based on a plurality of pressure reduction cycles detected by the pressure reduction cycle detection means.

According to this preferred embodiment, in the leakage determination process, first, negative pressure is introduced from the intake system, whereby the pressure within the evaporative fuel processing system is reduced to the predetermined negative pressure. After the reduction of the pressure within the evaporative fuel processing system, negative pressure is introduced from the intake system while holding the evaporative fuel processing system in the closed state, whenever the pressure within the evaporative fuel processing system rises to reach the predetermined pressure higher than the predetermined negative pressure, to thereby repeatedly reduce the pressure within the evaporative fuel processing system to the second negative pressure. Then, whether or not there is a leak in the evaporative fuel processing system is determined based on the plurality of pressure reduction cycles detected during the repetition of pressure reduction. If there is a leak in the evaporative fuel processing system, an atmospheric pressure enters the evaporative fuel processing system via the leak. As a result, the rate of increase in the pressure within the evaporative fuel processing system after termination of the pressure reduction becomes faster, and hence the pressure reduction cycle becomes shorter than when there is no leak, so that it is possible to determine from the pressure reduction cycle whether or not there is a leak in the evaporative fuel processing system.

Further, since the pressure within the evaporative fuel processing system is repeatedly reduced, even when the pressure within the evaporative fuel processing system is temporarily increased e.g. due to an increase in the amount of generation of evaporative fuel in the fuel tank, it is possible to reduce the temporary rise in the pressure whenever it occurs, and detect a pressure reduction cycle subsequent thereto. Moreover, since whether or not there is a leak in the evaporative fuel processing system is determined based on the plurality of pressure reduction cycles detected during the repetition of pressure re-reduction, even when a temporary rise in the pressure has caused a variation in the pressure reduction cycle, it is possible to assess the plurality of pressure reduction cycles as a whole, thereby compensating for the variation in the pressure reduction cycle. Thus, the influence of the temporary rise in the pressure caused by other factors than leakage on the leakage determination can be eliminated, which enables accurate determination of whether or not there is a leak in the evaporative fuel processing system.

To attain the above object, according to a second aspect of the invention, there is provided a leakage determination method for an evaporative fuel processing system that causes a canister to absorb evaporative fuel generated from a fuel tank and supplies the evaporative fuel absorbed in the canister to an intake system of an internal combustion engine, the leakage determination method comprising:

a pressure detection step of detecting pressure within the evaporative fuel processing system;

a pressure reduction step of reducing the pressure within the evaporative fuel processing system until the detected pressure within the evaporative fuel processing system becomes equal to a predetermined negative pressure, by introducing negative pressure from the intake system;

a negative pressure introduction step of introducing the negative pressure from the intake system into the evaporative fuel processing system under predetermined conditions after the pressure reduction at the pressure reduction step; and a leakage determination step of determining whether or not there is a leak in the evaporative fuel processing system, based on a state of the pressure within the evaporative fuel processing system, which has been detected during the introduction of the negative pressure from the intake system.

Preferably, at the negative pressure introduction step, the negative pressure from the intake system is introduced at a predetermined constant negative pressure introduction flow rate.

More preferably, in the leakage determination method according to the second aspect of the invention, at the negative pressure introduction step, the negative pressure is introduced from the intake system while holding the evaporative fuel processing system in a closed state whenever the pressure within the evaporative fuel processing system rises to a predetermined pressure higher than the predetermined negative pressure, whereby the pressure within the evaporative fuel processing system is repeatedly reduced to a second predetermined negative pressure lower than the predetermined pressure, the leakage determination method further comprising a pressure reduction cycle detection step of detecting a pressure reduction cycle of the pressure reduction at the negative pressure introduction step, and the leakage determination step includes determining whether or not there is a leak in the evaporative fuel processing system based on a plurality of detected pressure reduction cycles.

To attain the above object, according to a third aspect of the invention, there is provided a recording medium storing a leakage determination control program for causing a computer to carry out leakage determination for an evaporative fuel processing system that causes a canister to absorb evaporative fuel generated from a fuel tank and supplies the evaporative fuel absorbed in the canister to an intake system of an internal combustion engine.

The recording medium is characterized in that the leakage determination control program causes the computer to detect pressure within the evaporative fuel processing system, reduce the pressure within the evaporative fuel processing system until the detected pressure within the evaporative fuel processing system becomes equal to a predetermined negative pressure, by introducing negative pressure from the intake system, introduce the negative pressure from the intake system into the evaporative fuel processing system under predetermined conditions after the pressure reduction to the predetermined negative pressure, and determine whether or not there is a leak in the evaporative fuel processing system, based on a state of the pressure within the evaporative fuel processing system, which has been detected during the introduction of the negative pressure from the intake system.

Preferably, the leakage determination control program causes the negative pressure to be introduced from the intake system at a predetermined constant negative pressure introduction flow rate, after the pressure reduction to the predetermined negative pressure.

Also preferably, the leakage determination control program causes the negative pressure to be introduced while causing the evaporative fuel processing system to be held in a closed state, after the pressure reduction to the predetermined negative pressure, whenever the pressure within the evaporative fuel processing system rises to a predetermined pressure higher than the predetermined negative pressure, thereby repeatedly reducing the pressure within the evaporative fuel processing system to a second predetermined negative pressure lower than the predetermined pressure, detecting a cycle of the pressure reduction, and determining whether or not there is a leak in the evaporative fuel processing system, based on a plurality of detected pressure reduction cycles.

The above and other objects, features, and advantages of the invention will become more apparent from the following detailed description taken in conjunction with the accompanying drawings.

DETAILED DESCRIPTION OF PREFERRED EMBODIMENTS

Figure 1:
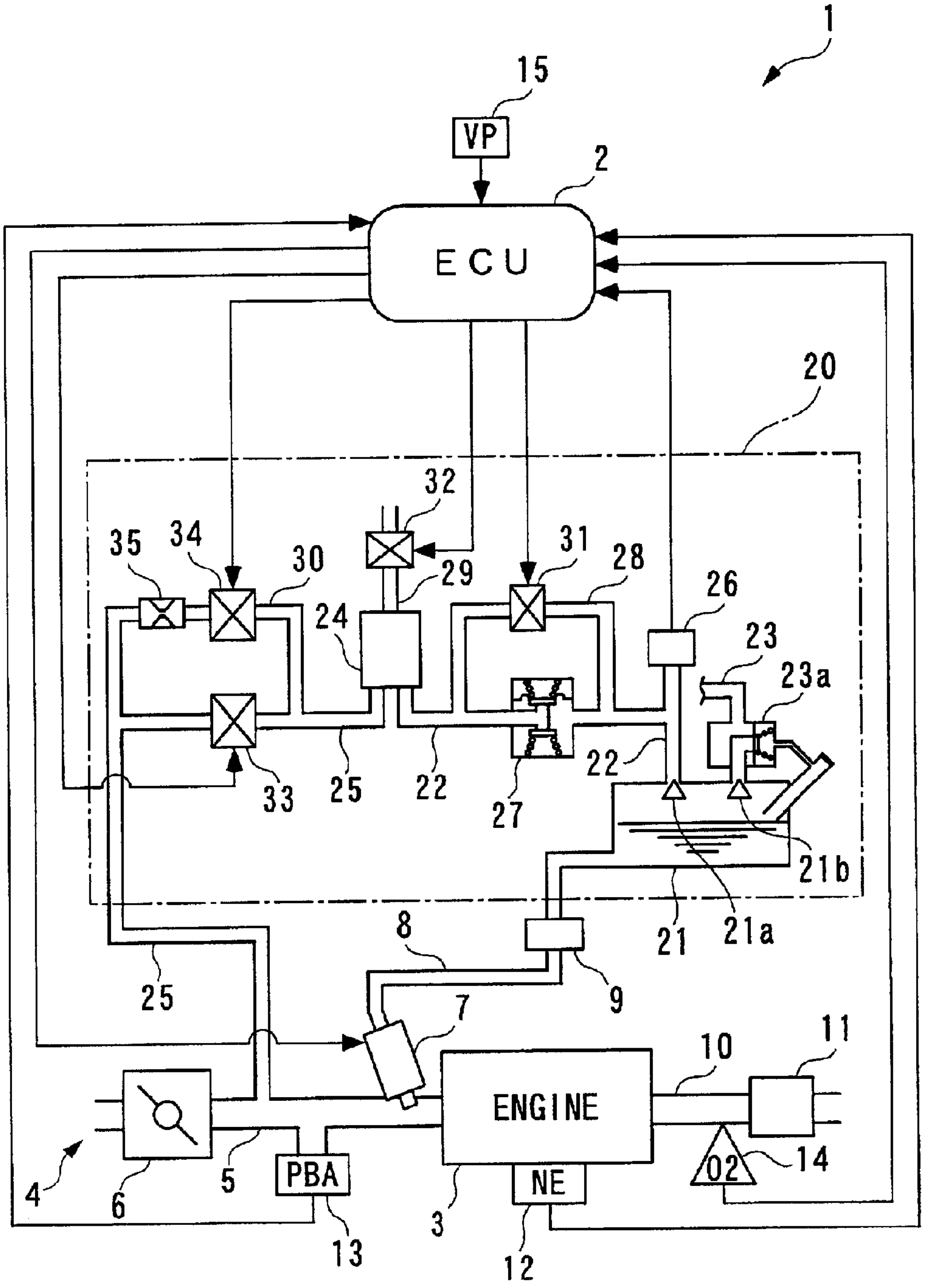
FIG. 1 is a block diagram schematically showing the arrangement of an evaporative fuel processing system for an internal combustion engine incorporating a leakage determination system according to first and second embodiments of the invention.

The invention will now be described in detail with reference to the drawings showing embodiments thereof. Referring first to FIG. 1, there is schematically shown the arrangement of an evaporative fuel processing system for an internal combustion engine incorporating a leakage determination system according to a first or second embodiment of the present invention. The leakage determination system 1 carries out determination whether or not there is a leak in the evaporative fuel processing system 20 for the internal combustion engine 3 (hereinafter simply referred to as "the engine 3") and includes an ECU 2 (pressure reduction means, pressure re-reduction means, pressure reduction cycle detection means, negative pressure introduction means, leakage determination means). The evaporative fuel processing system 20 and the ECU 2 will be described in detail hereinafter.

The engine 3 is a gasoline engine which is installed on an automotive vehicle, not shown. The engine 3 has an engine rotational speed sensor 12 mounted thereto for detecting a rotational speed NE of the engine and delivering a signal indicative of the sensed engine rotational speed NE to the ECU 2.

Further, the engine 3 has an intake system 4 including an intake pipe 5 and a throttle valve 6 arranged in an intermediate portion of the intake pipe 5. At a location downstream of the throttle valve 6, there is mounted an intake pipe absolute pressure sensor 13 in a manner inserted into the intake pipe 5. The intake pipe absolute pressure sensor 13 senses an intake pipe absolute pressure PBA within the intake pipe 5, and delivers a signal indicative of the sensed absolute pressure PBA to the ECU 2.

Further, injectors (fuel injection valves) 7 (only one of which is shown) are inserted into the intake pipe 5 at locations downstream of the intake pipe absolute pressure sensor 13 in a manner facing respective intake ports, not shown, of the engine 3. A fuel injection time period TOUT over which each injector 7 is opened is controlled by the ECU 2. The injector 7 is connected to a fuel tank 21 via a fuel supply pipe 8. In an intermediate portion of the fuel supply pipe 8, there is arranged a fuel pump 9 for delivering fuel to the injector 7 by pressure.

On the other hand, in an exhaust pipe 10 at a location upstream of a catalyst device 11, there is mounted an O2 sensor 14. The O2 sensor 14 detects the concentration of oxygen contained in exhaust gases and delivers a signal indicative of the sensed oxygen concentration to the ECU 2. Based on the signal from the O2 sensor 14, the ECU 2 calculates an air-fuel ratio correction coefficient KO2 for use in calculation of the fuel injection time period TOUT.

Further, the automotive vehicle is equipped with a vehicle speed sensor 15. The vehicle speed sensor 15 detects a vehicle speed VP and delivers a signal indicative of the sensed vehicle speed VP to the ECU 2.

Next, the aforementioned evaporative fuel processing system 20 will be described in detail. The evaporative fuel processing system 20 temporarily stores evaporative fuel generated from the fuel tank 21, in a canister 24, and delivers the same into the intake pipe 5 as required. The evaporative fuel processing system 20 includes the fuel tank 21, a charge passage 22, a refueling-time charge passage 23 for use during refueling, the canister 24, and a purge passage 25.

The fuel tank 21 is connected to the canister 24 via the charge passage 22 and the refueling-time charge passage 23. Fuel generated in the fuel tank 21 is sent to the canister 24 through the charge passage 22. A pressure sensor 26 (pressure detection means) is arranged in the charge passage 22 at a location close to the fuel tank 21. The pressure sensor 26 formed e.g. by a piezoelectric element detects pressure within the charge passage 22 and delivers a signal indicative of the sensed pressure to the ECU 2. Normally, the pressure within the charge passage 22 is approximately equal to pressure within the fuel tank 21, and hence hereinafter referred to as the tank internal pressure PTANK.

Further, the charge passage 22 has a two-way valve 27 arranged therein at a location between the pressure sensor 26 and the canister 24. The two-way valve 27 is formed by a mechanical valve comprised of a diaphragm-type positive pressure valve and a diaphragm-type negative pressure valve. The positive pressure valve opens when the tank internal pressure PTANK exceeds the atmospheric pressure by a predetermined value. This opening operation of the positive pressure valve allows delivery of evaporative fuel from the fuel tank 21 to the canister 24. On the other hand, the negative pressure valve opens when the tank internal pressure PTANK becomes lower than pressure within the canister 24 by a predetermined value, whereby evaporative fuel stored in the canister 24 is returned to the fuel tank 21.

Further, in an intermediate portion of the charge passage 22, there is provided a charge bypass passage 28 bypassing the two-way valve 27 and connecting between a canister-side portion of the charge passage 22 downstream of the two-way valve 27 and a pressure sensor-side portion of the same upstream of the two-way valve 27. In an intermediate portion of the charge bypass passage 28, there is arranged a charge bypass valve 31 (pressure reduction means, pressure re-reduction means, negative pressure introduction means). The charge bypass valve 31 formed by a normally-closed solenoid valve is normally held closed to maintain the charge bypass passage 28 in a closed state, and opens when it is driven by the ECU 2, to open the charge bypass passage 28.

The aforementioned refueling-time charge passage 23 (only a portion thereof is shown) is for use in sending a large amount of evaporative fuel generated in the fuel tank 21 particularly during refueling to the canister 24. The refueling-time charge passage 23 has a larger diameter than that of the charge passage 22. In an intermediate portion of the refueling-time charge passage 23, there is arranged a diaphragm valve 23*a* for opening and closing the refueling-time charge passage 23. The diaphragm valve 23*a* is held closed except during refueling. When refueling, the diaphragm valve 23*a* opens, whereby evaporative fuel is delivered to the canister 24 via the refueling-time charge passage 23.

The fuel tank 21 is provided with float valves 21*a*, 21*b*. The float valves 21*a*, 21*b* open and close respective fuel tank-side openings of the charge passage 22 and the refueling-time charge passage 23. Normally, the valves 21*a*, 21*b* hold the two passages 22, 23 open, respectively, whereas e.g. when the fuel tank 21 jolts or becomes full, the valves 21*a*, 21*b* close the respective openings of the passages 22, 23 to thereby prevent fuel from flowing into the two passages 22, 23.

The canister 24 contains activated carbon for absorbing evaporative fuel. Further, the canister 24 is connected to an atmosphere passage 29 open to the atmosphere. The atmosphere passage 29 is provided with a vent shut valve 32 for opening and closing the same. The vent shut valve 32 formed by a normally-open solenoid valve is normally held open to maintain the atmosphere passage 29 in an open state, and closes when it is driven by the ECU 2, to close the atmosphere passage 29.

In an intermediate portion of the purge passage 25, there is arranged a purge control valve 33 (pressure reduction means) for opening and closing the purge passage 25. The purge control valve 33 is formed by a solenoid valve whose degree of opening continuously changes according to the duty ratio of a drive signal from the ECU 2. By opening the purge control valve 33 when the vent shut valve 32 is open, evaporative fuel absorbed by the canister 24 is delivered into the intake pipe 5 by negative pressure within the intake pipe 5. The ECU 2 performs duty control of the degree of opening of the purge control valve 33 during purge control to thereby control the flow rate, or purge rate, of the evaporative fuel delivered from the canister 24 into the intake pipe 5.

Further, connected to the purge passage 25 is a purge bypass passage 30 similar to the charge bypass passage 28. The purge bypass passage 30 which bypasses the purge control valve 33 connects between a portion of the purge passage 25 at a location between the purge control valve 33 and the canister 24 and a portion of the same at a location downstream of the purge control valve 33. In an intermediate portion of the purge bypass passage 30, there are mounted a purge bypass valve 34 and a jet 35 in the mentioned order from the canister side.

The purge bypass valve 34 (pressure re-reduction means, negative pressure introduction means) formed by a normally-closed solenoid valve is normally closed to maintain the purge bypass passage 30 in a closed state, and opens when it is driven by the ECU 2, to open the purge bypass passage 30. When the purge bypass valve 34 opens, the negative pressure within the intake pipe 5 is introduced into the evaporative fuel processing system 20, whereby the pressure within the evaporative fuel processing system 20 is reduced. The jet 35 (negative pressure introduction means) is formed by an orifice having a predetermined diameter, for limiting the flow rate of evaporative fuel flowing through the purge bypass passage 30 to a predetermined flow rate and limiting the flow rate (of a gas containing evaporative fuel) for introduction of the negative pressure to a predetermined constant flow rate.

The ECU 2 is formed by a microcomputer including an I/O interface, a CPU, a RAM and a ROM, none of which are shown. The signals input to the ECU 2 from the sensors 12 to 15, 26 are subjected to A/D conversion and waveform shaping by the I/O interface and then input to the CPU. The CPU determines operating conditions of the engine 3 based on the signals and carries out a leakage determination process, described in detail hereinafter, while driving the valves 31 to 34, based on control programs stored in the ROM in advance and data stored in the RAM.

Figure 2:
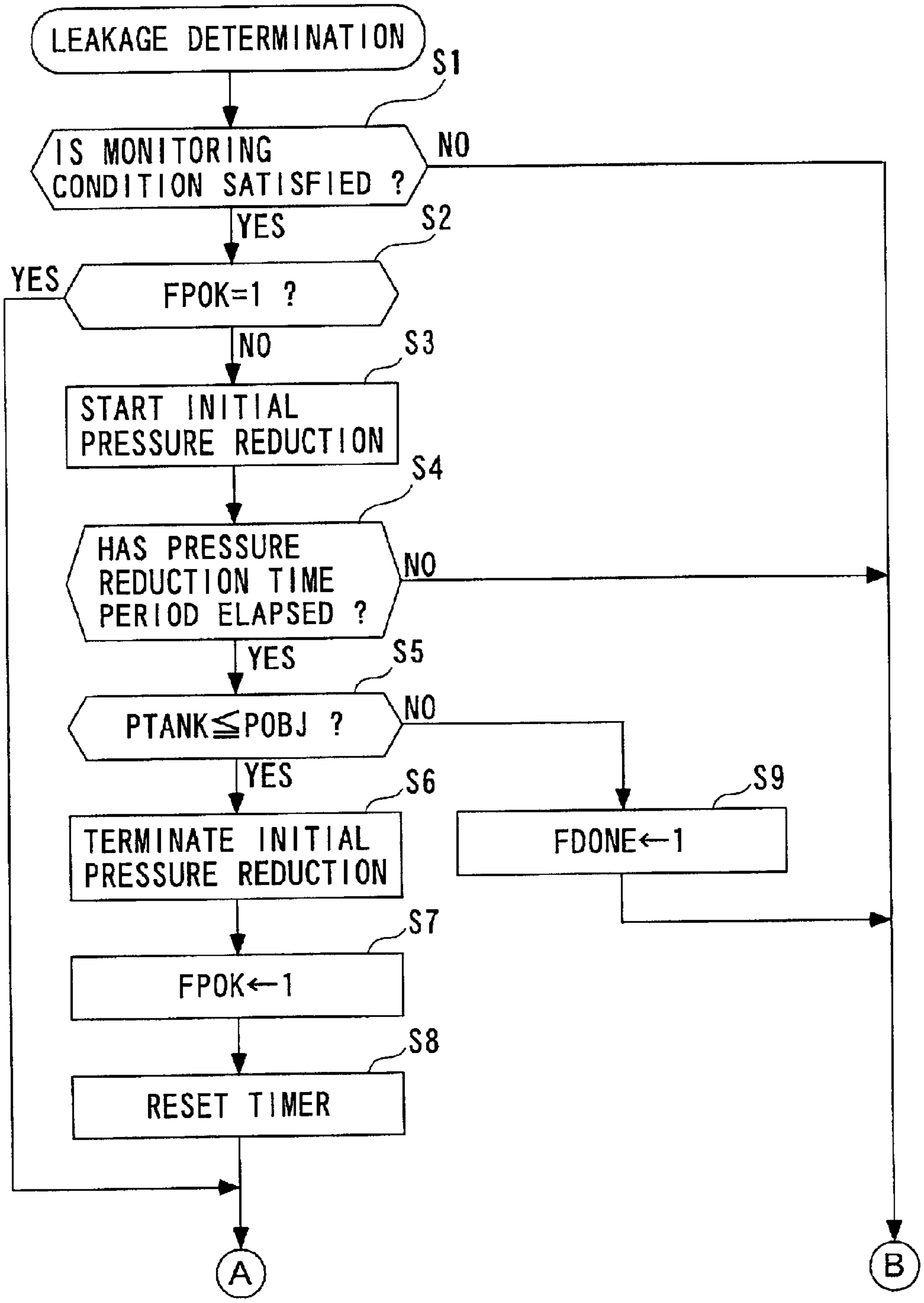
FIG. 2 is a flowchart of a routine for a leakage determination process executed by the FIG. 1 leakage determination system according to the first embodiment.
Figure 3:
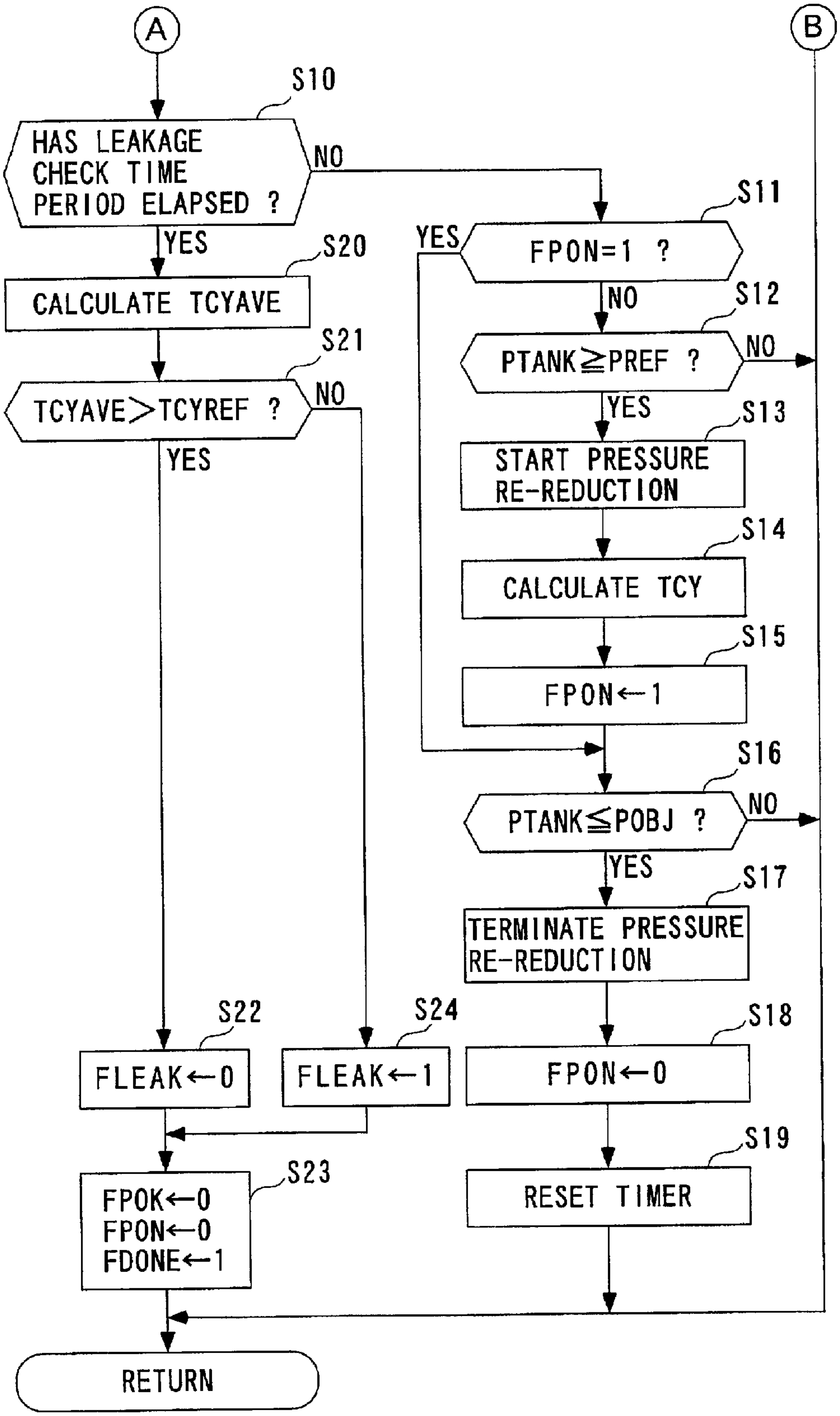
FIG. 3 is a continuation of the FIG. 2 flowchart.

In the following, a leakage determination process for the evaporative fuel processing system 20, according to the first embodiment, which is executed by the ECU 2, will be described with reference to FIGS. 2 and 3 showing flowcharts of a program for carrying out the leakage determination process. The process or program is carried out by an interrupt handling routine at predetermined time intervals (e.g. every 80 msec.) set by a timer, but not carried out after execution of leakage determination at a step S21, referred to hereinafter. That is, the leakage determination by the present process is carried out only once during a time period from the start of operation of the engine 3 to the end thereof.

First, it is determined at a step S1 whether or not a monitoring condition is satisfied. The determination as to the monitoring condition is carried out so as to determine whether or not conditions for executing the leakage determination process are satisfied, and only when the following conditions (1) to (4) are all satisfied, it is determined that the monitoring condition is satisfied.

(1) Purge control is being executed with the purge control valve 33 in the open state.

(2) The engine 3 is in a predetermined steady operating condition (which is determined e.g. based on the intake pipe absolute pressure PBA and the engine rotational speed NE).

(3) The vehicle is cruising with a small change in the vehicle speed VP.

(4) The air-fuel ratio correction coefficient KO2 is equal to or larger than a predetermined value, and hence the influence of purged fuel upon the air-fuel ratio A/F is small.

If the answer to the question of the step S1 is negative (NO), i.e. if at least one of the conditions (1) to (4) is not satisfied, the program is immediately terminated.

On the other hand, if the answer to the question is affirmative (YES), i.e. if the conditions (1) to (4) are all satisfied, the program proceeds to a step S2, wherein it is determined whether or not an initial pressure reduction termination flag FPOK assumes "1". The initial pressure reduction termination flag FPOK is set to "1" at a step S7 upon termination of initial pressure reduction carried out at steps S3 to S6 described below.

Immediately after the present process is started, the flag FPOK assumes "0", so that the answer to the question of the step S2 is negative (NO). Therefore, the program proceeds to the step S3, wherein the initial pressure reduction for reducing the pressure within the evaporative fuel processing system 20 is started. More specifically, in a state of the purge bypass valve 34 being held closed, the vent shut valve 32 is closed, and the charge bypass valve 31 is opened. At the same time, the duty ratio of the purge control valve 33 is controlled based on the tank internal pressure PTANK detected by the pressure sensor 26, such that the tank internal pressure PTANK becomes equal to a predetermined negative pressure POBJ (predetermined negative pressure, second predetermined negative pressure (e.g. −20 hPa)). As a result, the evaporative fuel processing system 20 communicates with the intake pipe 5, and negative pressure is introduced from the intake pipe 5 into the evaporative fuel processing system 20, whereby the tank internal pressure PTANK is reduced to the predetermined negative pressure POBJ. In this case, since the charge bypass valve 31 is open, the tank internal pressure PTANK represents the pressure within the evaporative fuel processing system 20.

Then, the program proceeds to the step S4, wherein it is determined whether or not a pressure reduction time period has elapsed. The pressure reduction time period is set to a value (e.g. 15 sec.) within which the tank internal pressure PTANK is expected to be positively lowered by the initial pressure reduction to the predetermined negative pressure POBJ so long as there is no large amount of leakage from the evaporative fuel processing system 20 and the valves 31 to 34 and the pressure sensor 26 are normally operating. If the answer to the question of the step S4 is negative (NO), i.e. if the pressure reduction time period has not elapsed, the program is immediately terminated.

On the other hand, if the answer to the question of the step S4 is affirmative (YES), i.e. if the pressure reduction time period has elapsed, the program proceeds to the step S5, wherein it is determined whether or not the tank internal pressure PTANK is equal to or lower than the predetermined negative pressure POBJ.

If the answer to the question is negative (NO), i.e. if PTANK≦POBJ holds, it is judged that there is a large amount of leakage within the evaporative fuel processing system 20 or one or more of the valves 31 to 34 and the pressure sensor 26 are not normally operating, and hence that the leakage determination for the system 20 cannot be normally performed, so that a leakage determination termination flag FDONE is set to "1" at a step S9, followed by terminating the program. By setting the leakage determination termination flag FDONE to "1", the present program or the leakage determination by the present process is prevented from being executed from this time on.

If the answer to the question of the step S5 is affirmative (YES), i.e. if PTANK≦POBJ holds, the program proceeds to the step S6, wherein the initial pressure reduction is terminated. More specifically, in a state of the vent shut valve 32 and the purge bypass valve 34 being held closed and the charge bypass valve 31 being held open, the purge control valve 33 is closed to close the evaporative fuel processing system 20.

Then, the program proceeds to the step S7, wherein the initial pressure reduction termination flag FPOK is set to "1". Further, at the following step S8, the count of a pressure reduction timer formed by a programmable countup timer is reset to "0", and then counting by the timer is started, followed by the program proceeding to a step S10 in FIG. 3. Once the initial pressure reduction termination flag FPOK is set to "1" at the step S7, the answer to the question of the step S2 becomes affirmative (YES) in the following loops. Therefore, the steps S3 to S8 are skipped, and the program jumps to the step S10.

At the step S10, it is determined whether or not a leakage check time period has elapsed. The leakage check time period is set to a value (e.g. 60 sec.) which positively allows pressure re-reduction, described in detail hereinafter, to be repeatedly carried out a plurality of times irrespective of whether or not there is a leak in the evaporative fuel processing system 20.

If the answer to the question of the step S10 is negative (NO), i.e. if the leakage check time period has not elapsed, the program proceeds to a step S11, wherein it is determined whether or not a pressure re-reduction-in process flag FPON assumes "1". The pressure re-reduction-in process flag FPON indicates whether or not pressure re-reduction is being executed, and hence, as described hereinbelow, it is set to "1" when the pressure re-reduction is being executed, whereas it is set to "0" when the pressure re-reduction is not being executed.

If the answer to the question of the step S11 is negative (NO), i.e. if the pressure re-reduction is not being executed, the program proceeds to a step S12, wherein it is determined whether or not the tank internal pressure PTANK is equal to or higher than a predetermined pressure PREF (e.g. −17 hPa) which is higher than the predetermined negative pressure POBJ. If the answer to this question is negative (NO), i.e. if PTANK<PREF holds, the program is immediately terminated.

On the other hand, if the answer to the question of the step S12 is affirmative (YES), i.e. if the tank internal pressure PTANK has risen to a level equal to or higher than the predetermined pressure PREF (PTANK≧PREF), the program proceeds to a step S13, wherein the pressure re-reduction is started. More specifically, in a state of the charge bypass valve 31 being held open and the vent shut valve 32 and the purge control valve being held closed, the purge bypass valve 34 is opened. As a result, the evaporative fuel processing system 20 communicates with the intake pipe 5, whereby the pressure within the evaporative fuel processing system 20 is reduced by the negative pressure within the intake pipe 5, and this pressure reduction is carried out by introducing the negative pressure into the evaporative fuel processing system 20 via the jet 35, so that the pressure re-reduction is executed at a constant pressure reduction rate.

Then, the program proceeds to a step S14, wherein a count of the pressure reduction timer at the present time point is obtained (sampled) as a present pressure reduction cycle TCY and stored in the RAM. Thus, the pressure reduction cycle TCY is calculated as a time period between the immediately preceding pressure reduction termination timing and the present pressure reduction start timing.

Then, at the following step S15, the pressure re-reduction-in process flag FPON is set to "1", followed by the program proceeding to a step S16. As a result, in the following loops, the answer to the question of the step S11 becomes affirmative (YES), so that the steps S12 to S15 are skipped, and the program jumps to the step S16.

At the step S16, similarly to the step S5, it is determined whether or not the tank internal pressure PTANK is equal to or lower than the predetermined negative pressure POBJ. If the answer to the question is negative (NO), i.e. if the tank internal pressure PTANK has not been reduced to the predetermined negative pressure POBJ, the program is immediately terminated.

On the other hand, if the answer to the question of the step S16 is affirmative (YES), i.e. if PTANK≦POBJ holds, the pressure re-reduction is terminated at a step S17, and then the flag FPON is set to "0" at a step S18 so as to indicate the termination of the pressure re-reduction. Subsequently, similarly to the step S8, the count of the pressure reduction timer is reset to "0", and the counting by the timer is started at a step S19, followed by terminating the program. More specifically, the pressure re-reduction is terminated by closing the purge bypass valve 34 with the charge bypass valve 31 held open and the vent shut valve 32 and the purge control valve 33 held closed, whereby the evaporative fuel processing system 20 is closed.

From this time on, the steps S11 to S19 are repeatedly executed until the leakage check time period has elapsed, and whenever the tank internal pressure PTANK rises to the predetermined pressure PREF, the re-reduction of the pressure PTANK to the predetermined negative pressure POBJ and calculation of the pressure reduction cycle TCY are repeatedly carried out.

On the other hand, if the answer to the question of the step S10 is affirmative (YES), i.e. if the leakage check time period has elapsed, the program proceeds to a step S20, wherein the plurality of pressure reduction cycles TCY are averaged to thereby calculate an averaged pressure reduction cycle TCYAVE.

Then, the program proceeds to a step S21, wherein it is determined whether or not the averaged pressure reduction cycle TCYAVE is larger than a predetermined value TCYREF. The predetermined value TCYREF is set as a threshold value for determining whether or not there is a leak in the evaporative fuel processing system 20. If the answer to the question is affirmative (YES), i.e. if TCYAVE>TCYREF holds, it is judged that there is no leak in the evaporative fuel processing system 20, and the program proceeds to a step S22, wherein a leakage determination flag FLEAK is set to "0" so as to indicate that there is no leak in the system 20.

Then, at the following step S23, the initial pressure reduction termination flag FPOK and the pressure re-reduction-in process flag FPON are each set to "0", and the leakage determination flag FDONE is set to "1", followed by terminating the program. Similarly to the step S9, since the leakage determination termination flag FDONE is set to "1", the present program will not be executed from this time on. That is, the leakage determination by the present process is performed only once during a time period from the start of operation of the engine 3 to the end thereof.

On the other hand, if the answer to the question of the step S21 is negative (NO), i.e. if TCYAVE≦TCYREF holds, it is judged that there is a leak in the evaporative fuel processing system 20, and the program proceeds to a step S24, wherein the leakage determination flag FLEAK is set to "1" so as to indicate that there is a leak in the evaporative fuel processing system 20. Then, the step S23 is executed, followed by terminating the program.

Next, examples of changes in the tank internal pressure PTANK exhibited by execution of the above leakage determination process will be described with reference to timing charts shown in FIGS. 4 and 5. These figures show changes in the tank internal pressure PTANK obtained when there is no leak in the evaporative fuel processing system 20 and when there is a leak in the same, respectively.

As shown in each of the figures, first, when the initial pressure reduction is started (time t0, t10), the tank internal pressure PTANK falls. Thereafter, at a time point (time t1, t11) the tank internal pressure PTANK has fallen to the predetermined negative pressure POBJ and the pressure reduction time period has elapsed, the purge control valve 33 is closed in synchronism with the lapse of the pressure reduction time period, whereby the evaporative fuel processing system 20 is closed. Then, at a time point (time t2, t12) the tank internal pressure PTANK has slowly risen to reach the predetermined pressure PREF higher than the predetermined negative pressure POBJ, the pressure re-reduction is started, and at a time point (time t3, t13) the tank internal pressure PTANK has been reduced to the predetermined negative pressure POBJ, the evaporative fuel processing system 20 is closed again. After the time t3 or t13, whenever the tank internal pressure PTANK reaches the predetermined pressure PREF (e.g. time t4, t14), the pressure re-reduction is repeatedly carried out a plurality of times.

Figure 4:
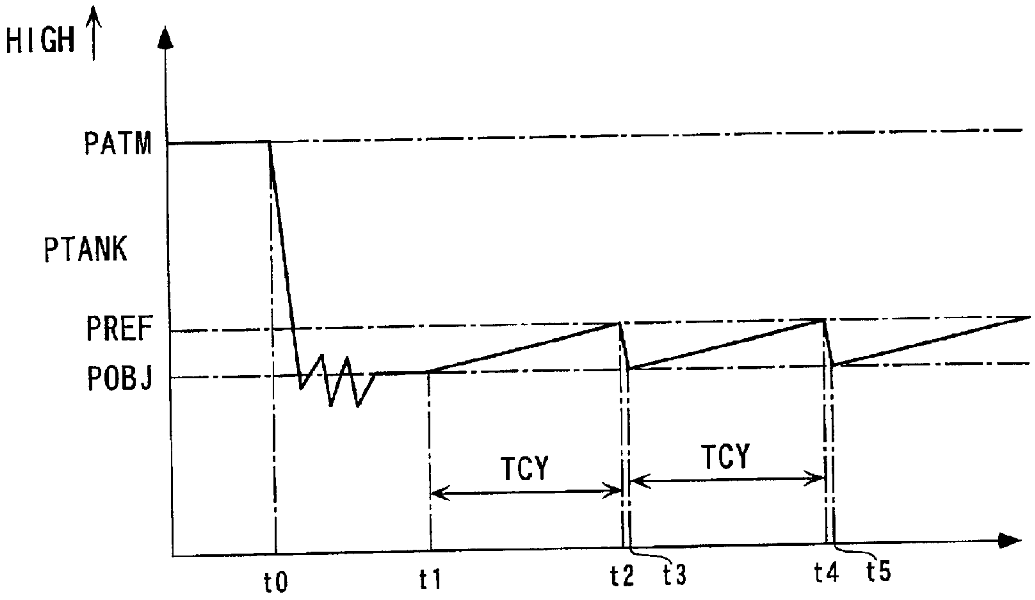
FIG. 4 is a timing chart showing an example of changes in a tank internal pressure PTANK detected through execution of pressure re-reduction when there is no leak in the evaporative fuel processing system.
Figure 5:
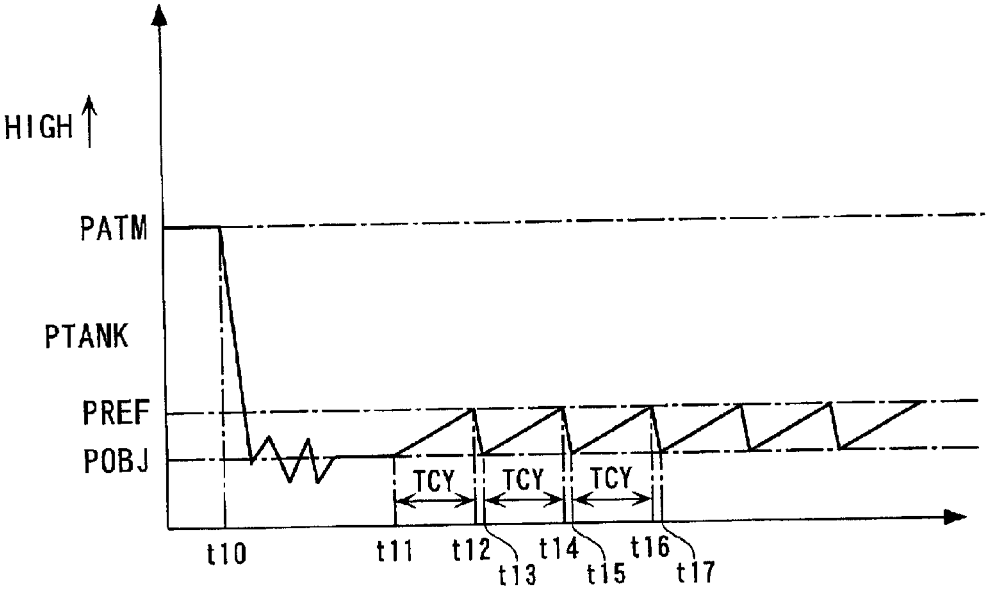
FIG. 5 is a timing chart showing an example of changes in the tank internal pressure PTANK detected through execution of pressure re-reduction when there is a leak in the evaporative fuel processing system.

When the pressure re-reduction is repeatedly carried out as described above, the pressure reduction cycle TCY is longer in the FIG. 4 case where there is no leak, due to a slow rate of increase in the tank internal pressure PTANK, than in the FIG. 5 case where there is a leak.

As described above, according to the leakage determination system 1 of the present embodiment, since the re-reduction of the pressure within the evaporative fuel processing system 20 is repeatedly carried out, even if the tank internal pressure PTANK is temporarily increased e.g. due to an increase in the amount of generation of evaporative fuel in the fuel tank 21, it is possible to reduce the temporary rise in the tank internal pressure PTANK whenever it occurs, and detect the pressure reduction cycle TCY. Whether or not there is a leak in the evaporative fuel processing system 20 is determined based on the averaged pressure reduction cycle TCYAVE as an averaged value of a plurality of pressure reduction cycles TCY detected during the repetition of pressure re-reduction. Therefore, even when a temporary rise in the tank internal pressure PTANK has caused a variation in the pressure reduction cycle TCY, the leakage determination carried out by the use of the averaged pressure reduction cycle TCYAVE described above makes it possible to assess the plurality of pressure reduction cycles TCY as a whole while compensating for the variation in the pressure reduction cycles TCY. Thus, the influence of the temporary rise in the tank internal pressure PTANK on the leakage determination can be reduced, which enables accurate determination of whether or not there is a leak in the evaporative fuel processing system 20.

Although in the above embodiment, the jet 35 and the purge bypass valve 34 are used for pressure re-reduction, the pressure re-reduction may be carried out by introducing negative pressure from the intake system 4 at a low flow rate (of a gas containing evaporative fuel) by using the purge control valve 33 in place of the jet 35 and the purge bypass valve 34. Further, although in the above embodiment, the reference value for control of the initial pressure reduction and the threshold value for termination of the pressure re-reduction are set to an identical value (predetermined negative pressure POBJ), they may be set, respectively, to two values different from each other. Moreover, although in the present embodiment, the pressure reduction cycles TCY are detected by operation of the ECU 2, this is not limitative, but any suitable method capable of determining the pressure reduction cycles TCY may be employed. In addition, the start of counting of each pressure reduction cycle TCY may be delayed to prevent erroneous determination due to noise generated by the pressure sensor 26. Further, although in the above embodiment, whether or not there is a leak is determined based on the pressure reduction cycles TCY, the determination may be made based on the number of pressure re-reductions executed during a leakage check time period.

Furthermore, although in the above embodiment, the leakage check (leakage determination) is performed on the whole evaporative fuel processing system 20, a leakage check may be executed only on the fuel tank 23 side by holding the charge bypass valve 31 closed during the leakage check and open during pressure re-reduction. This makes it possible to determine which of the canister 24 side and the fuel tank 23 side has a leak.

Next, a leakage determination process for the evaporative fuel processing system 20, according to the second embodiment, will be described with reference to FIGS. 6 and 7. Similarly to the first embodiment, the leakage determination process of the present embodiment is executed by the ECU 2.

Figure 6:
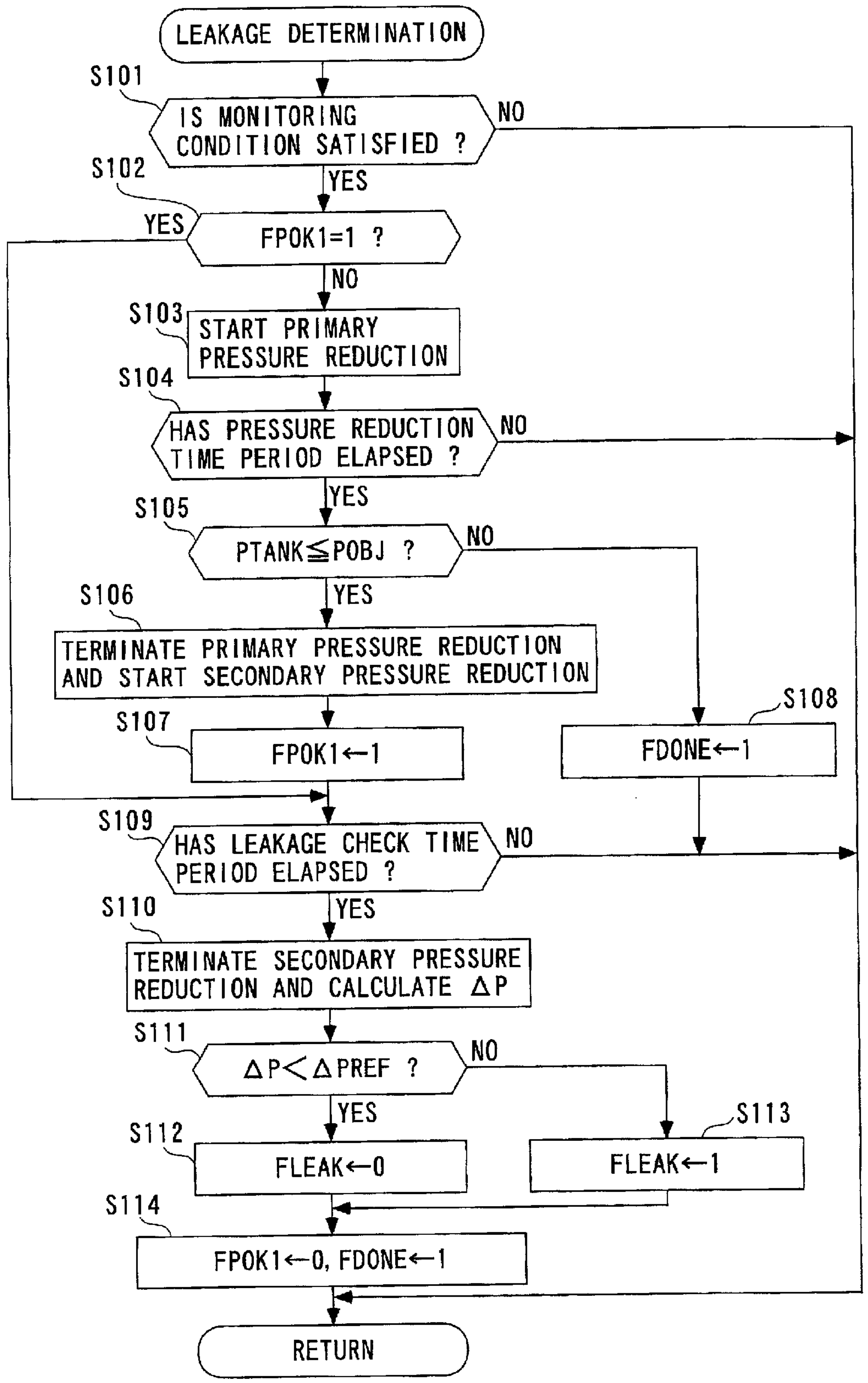
FIG. 6 is a flowchart of a routine for a leakage determination process executed by the FIG. 1 leakage determination system according to the second embodiment of the invention.

FIG. 6 is a flowchart showing a program for carrying out the leakage determination process. Similarly to that of the first embodiment, the process is carried out by an interrupt handling routine at predetermined time intervals (e.g. every 80 msec.) set by a timer, but not carried out after execution of leakage determination at a step S114, referred to hereinafter. That is, in the present process, the leakage determination is carried out only once during a time period from the start of operation of the engine 3 to the end thereof.

First, it is determined at a step S101 whether or not a monitoring condition is satisfied. The monitoring condition is identical to that for the leakage determination of the first embodiment.

If the answer to the question of the step S101 is negative (NO), i.e. if the monitoring condition is not satisfied, the program is immediately terminated.

On the other hand, if the answer to the question is affirmative (YES), i.e. if the monitoring condition is satisfied, the program proceeds to a step S102, wherein it is determined whether or not a primary pressure reduction termination flag FPOK1 assumes "1". The flag FPOK1 is set to "1" at a step S107 upon termination of the primary pressure reduction carried out at steps S103 to S106 described below.

Immediately after the program is started, the flag FPOK1 assumes "0", so that the answer to the question of the step S102 is negative (NO). Therefore, the program proceeds to the step S103, wherein the primary pressure reduction for reducing pressure within the evaporative fuel processing system 20 is started. More specifically, in a state of the purge bypass valve 34 being held closed, the vent shut valve 32 is closed, and the charge bypass valve 31 is opened. At the same time, the duty ratio of the purge control valve 33 is controlled based on the tank internal pressure PTANK detected by the pressure sensor 26, such that the tank internal pressure PTANK becomes equal to a predetermined negative pressure POBJ (e.g. −20 hPa)). As a result, negative pressure is introduced from the intake pipe 5 into the evaporative fuel processing system 20, whereby the tank internal pressure PTANK is reduced to the predetermined negative pressure POBJ. In this case, since the charge bypass valve 31 is open, the tank internal pressure PTANK represents the pressure within the evaporative fuel processing system 20.

Then, the program proceeds to the step S104, wherein it is determined whether or not a pressure reduction time period has elapsed. The pressure reduction time period is set to a value (e.g. 15 sec.) within which the tank internal pressure PTANK is expected to be positively lowered by the primary pressure reduction to the predetermined negative pressure POBJ so long as the valves 31 to 34 and the pressure sensor 26 are normally operating and there is no large amount of leakage from the evaporative fuel processing system 20. If the answer to the question of the step S104 is negative (NO), i.e. if the pressure reduction time period has not elapsed, the program is immediately terminated.

On the other hand, if the answer to the question of the step S104 is affirmative (YES), i.e. if the pressure reduction time period has elapsed, the program proceeds to the step S105, wherein it is determined whether or not the tank internal pressure PTANK is equal to or lower than the predetermined negative pressure POBJ.

If the answer to the question is negative (NO), i.e. if PTANK>POBJ holds, it is judged that one or more of the valves 31 to 34 and the pressure sensor 26 are not normally operating or there is a large amount of leakage from the evaporative fuel processing system 20, and hence that the leakage determination for the system 20 cannot be normally performed, so that a leakage determination termination flag FDONE is set to "1" at a step S108, followed by terminating the program. By setting the leakage determination termination flag FDONE to "1", the present program or the leakage determination by the present process is prevented from being executed from this time on.

If the answer to the question of the step S105 is affirmative (YES), i.e. if PTANK≦POBJ holds, the program proceeds to the step S106, wherein the primary pressure reduction is terminated and a secondary pressure reduction is started in succession thereto. More specifically, in a state of the vent shut valve 32 being held closed and the charge bypass valve 31 being held open, the purge control valve 33 is closed and the purge bypass valve 34 is opened, whereby the evaporative fuel processing system 20 communicates with the intake pipe 5 only via the purge bypass passage 30, and negative pressure is introduced from the intake pipe 5 into the evaporative fuel processing system 20 at a constant flow rate Q (of a gas containing evaporative fuel) via the jet 35. The flow rate Q is set to a value (e.g. 3 liters per second) which will cause the tank internal pressure PTANK to slowly decrease during the secondary pressure reduction when there is no leak in the evaporative fuel processing system 20.

Then, at the following step S107, the primary pressure reduction termination flag FPOK1 is set to "1", followed by the program proceeding to a step S109. After the flag FPOK1 having been set to "1" at the step S107, the answer to the question of the step S102 becomes affirmative (YES) in the following loops. Therefore, in the following loops, the steps S103 to S108 are skipped, and the program jumps to the step S109.

At the step S109, it is determined whether or not a leakage check time period has elapsed. The leakage check time period is set to a time period (e.g. 30 sec.) e.g. after the start of the secondary pressure reduction, which is long enough to positively reveal the tendency of a change in the tank internal pressure PTANK dependent on whether or not there is a leak. If the answer to the question is negative (NO), i.e. if the leakage check time period has not elapsed, the program is immediately terminated.

On the other hand, if the answer to the question of the step S109 is affirmative (YES), i.e. if the leakage check time period has elapsed, the program proceeds to a step S110, wherein the secondary pressure reduction is terminated, and at the same time a variation amount ΔP of the tank internal pressure PTANK is calculated. The secondary pressure reduction is terminated by closing the charge bypass valve 31 and the purge bypass valve 34 and opening the vent shut valve 32 with the purge control valve 33 held closed.

The variation amount ΔP of the tank internal pressure PTANK is calculated as a differential pressure between a final tank internal pressure PTANK2 detected e.g. at the end of the counting of the leakage check time period, i.e. at a time point (time t22 in FIG. 7) the secondary pressure reduction is terminated and an initial tank internal pressure PTANK1 detected e.g. at the start of the counting of the leakage check time period, i.e. at a time point (time t21 in FIG. 7) the secondary pressure reduction is started (ΔP=PTANK2−PTANK1). It should be noted that PTANK1=POBJ is normally maintained by duty ratio control of the purge control valve 33.

Then, the program proceeds to a step S111, wherein it is determined whether or not the variation amount ΔP calculated at the step S110 is smaller than a predetermined leakage reference value ΔPREF (e.g. 5 hPa). If the answer to the question is affirmative (YES), i.e. if ΔP<ΔPREF holds, it is determined that the tank internal pressure PTANK is falling slowly or that the rate of increase in the tank internal pressure PTANK is small and hence that there is no leak in the evaporative fuel processing system 20. Then, a leakage determination flag FLEAK is set to "0" at a step S112 so as to indicate that there is no leak in the system 20, and the primary pressure reduction termination flag FPOK1 and the leakage determination termination flag FDONE are set to "0" and "1", respectively, at a step S114, followed by terminating the program.

On the other hand, if the answer to the question of the step S111 is negative (NO), i.e. if ΔP≧ΔPREF holds, it is judged that the rate of increase in the tank internal pressure PTANK is large and hence that there is a leak in the evaporative fuel processing system 20, so that the program proceeds to a step S113, wherein the leakage determination flag FLEAK is set to "1" so as to indicate that there is a leak in the system 20. Thereafter, the step S114 is executed, followed by terminating the program.

Next, examples of changes in the tank internal pressure PTANK detected through execution of the above leakage determination process will be described with reference to a timing chart shown in FIG. 7. In the figure, a solid line indicates a change in the tank internal pressure PTANK detected when there is no leak in the evaporative fuel processing system 20, while a broken line indicates a change in the tank internal pressure PTANK detected when there is a leak in the evaporative fuel processing system 20.

First, when the primary pressure reduction is started (time t20), the tank internal pressure PTANK falls. Thereafter, at a time point (time t21) the tank internal pressure PTANK has fallen to the predetermined negative pressure POBJ and the pressure reduction time period has elapsed, the purge control valve 33 is closed, and the charge bypass valve 34 is opened in synchronism with the lapse of the pressure reduction time period, whereby the primary pressure reduction is terminated, and the secondary pressure reduction is started. Then, at a time point (time t22) the leakage check time period has elapsed, the secondary pressure reduction is terminated, and the variation amount ΔP is calculated as a differential pressure between the final tank internal pressure PTANK2 and the initial tank internal pressure PTANK1. Further, the leakage determination is performed by comparing the variation amount ΔP with the leakage reference value ΔPREF.

Figure 7:
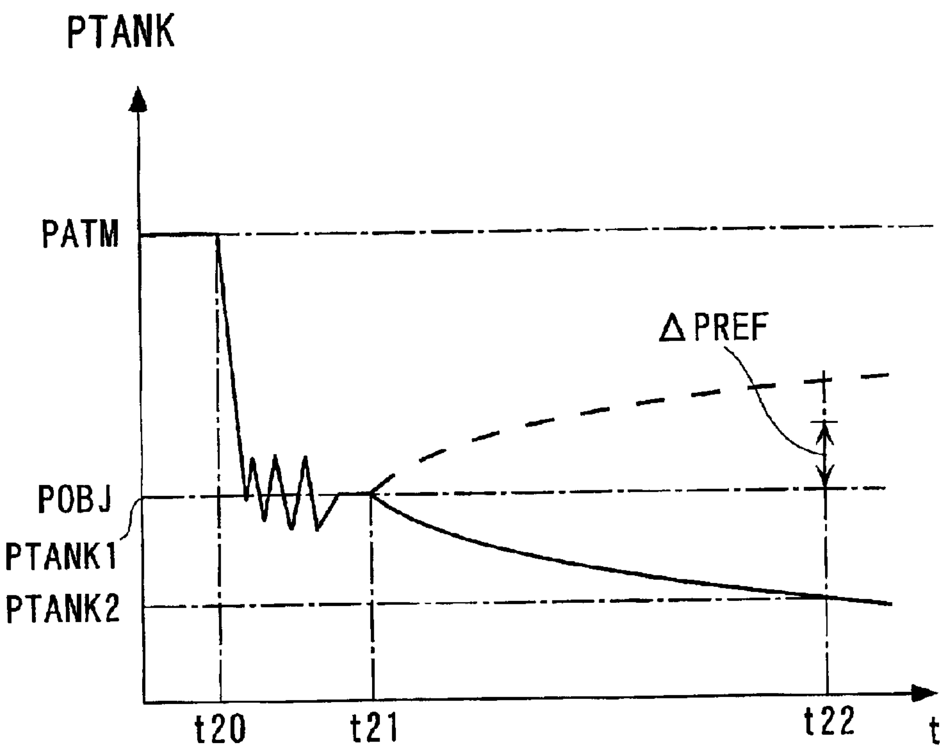
FIG. 7 is a timing chart showing examples of changes in the tank internal pressure PTANK detected through execution of the FIG. 6 leakage determination process.

If there is no leak in the evaporative fuel processing system 20, the tank internal pressure PTANK slowly falls during the secondary pressure reduction as indicated by the solid line in FIG. 7, so that the variation amount ΔP assumes a negative value, and hence the answer to the question of the step S111 becomes affirmative (YES)(ΔP<ΔPREF). From this, it is determined that there is no leak in the evaporative fuel processing system 20. On the other hand, if there is a leak in the evaporative fuel processing system 20, the tank internal pressure PTANK slowly rises as indicated by the broken line in the figure, and the variation amount ΔP becomes equal to or larger than the leakage reference value ΔPREF (ΔP≧ΔPREF). From this, it is determined that there is a leak in the evaporative fuel processing system 20.

As described above, according to the leakage determination system 1 of the present embodiment, during the secondary pressure reduction, the tank internal pressure PTANK is detected while introducing negative pressure from the intake system 4 into the evaporative fuel processing system 20, and the variation amount ΔP is calculated as a differential pressure between the final tank internal pressure PTANK2 and the initial tank internal pressure PTANK1. The calculated variation amount ΔP represents a final pressure value obtained as an offset between an increment of the initial tank internal pressure PTANK caused by a leak, if any, and a decrement of the same caused by introduction of the negative pressure. Therefore, it is possible to determine whether or not there is a leak in the evaporative fuel processing system 20 by comparing the variation amount ΔP with the predetermined reference value ΔPREF.

Further, since the tank internal pressure PTANK is detected while continuing the secondary pressure reduction, even if the tank internal pressure PTANK is temporarily increased e.g. due to an increase in the amount of generation of evaporative fuel in the fuel tank 21, it is possible to reduce the temporary rise in the tank internal pressure PTANK whenever it occurs, and carry out the leakage determination. Consequently, the influence of the temporary rise in the tank internal pressure PTANK caused by other factors than leakage on the leakage determination can be eliminated, which enables accurate determination of whether or not there is a leak in the evaporative fuel processing system 20.

Although in the above embodiment, the variation amount ΔP is calculated as a differential pressure between the final tank internal pressure PTANK2 and the initial tank internal pressure PTANK1 each detected during the secondary pressure reduction, it is possible to use a proper parameter other than the variation amount AP as one indicative of a change in the tank internal pressure PTANK during the secondary pressure reduction. For example, the variation amount ΔP may be calculated as a cumulative value of differences between a plurality of respective tank internal pressures PTANK detected at different time points during the secondary pressure reduction, and the initial tank internal pressure PTANK1, or alternatively as an integral value of the tank internal pressure PTANK calculated during the secondary pressure reduction, with respect to the initial tank internal pressure PTANK1.

Further, a flow rate adjustment valve may be used in place of the purge bypass valve 34 and the jet 35, for limiting the flow rate in the purge bypass passage 30 to a flow rate Q identical to that in the jet 35. Alternatively, the purge bypass passage 30, the purge bypass valve 34 and the jet 35 may be all omitted, and in place of the purge control valve 33, a control valve which is capable of accurately controlling the flow rate in the purge passage 25 within a range from the same flow rate Q as provided by the jet 35 to the same flow rate as provided by the purge control valve 33 may be used to carry out the purge control and the secondary pressure reduction. Further, alternatively, the purge bypass passage 30 may be formed separately from the purge passage 25, for communicating between the intake pipe 5 and the canister 24 during the secondary pressure reduction.

It is further understood by those skilled in the art that the foregoing are preferred embodiments of the invention, and that various changes and modifications may be made without departing from the spirit and scope thereof.

What is claimed is:

1. A leakage determination system for an evaporative fuel processing system that causes a canister to absorb evaporative fuel generated from a fuel tank and supplies the evaporative fuel absorbed in the canister to an intake system of an internal combustion engine, the leakage determination system comprising:

pressure detection means for detecting pressure within the evaporative fuel processing system;

primary pressure reduction means for primarily reducing the pressure within the evaporative fuel processing system until the detected pressure becomes equal to a predetermined negative pressure, by introducing negative pressure from the intake system;

secondary pressure reduction means for secondarily reducing the pressure within the evaporative fuel processing system by introducing the negative pressure from the intake system successively after the primary pressure reduction by said primary pressure reduction means under predetermined conditions; and leakage determination means for determining that there is a leak in the evaporative fuel processing system when a variation amount of the detected pressure detected during the secondary pressure reduction by said secondary pressure reduction is higher than a predetermined leakage reference value.

2. A leakage determination system according to claim 1, wherein said secondary pressure reduction means introduces the negative pressure from the intake system at a predetermined constant negative pressure introduction flow rate.

3. A leakage determination method for an evaporative fuel processing system that causes a canister to absorb evaporative fuel generated from a fuel tank and supplies the evaporative fuel absorbed in the canister to an intake system of an internal combustion engine, the leakage determination method comprising:

a pressure detection step of detecting pressure within the evaporative fuel processing system;

a primary pressure reduction step of primarily reducing the pressure within the evaporative fuel processing system until the detected pressure becomes equal to a predetermined negative pressure, by introducing negative pressure from the intake system;

a secondary pressure reduction step of secondarily reducing the pressure within the evaporative fuel processing system by introducing the negative pressure from the intake system successively after the primary pressure reduction at the primary pressure reduction step under predetermined conditions; and a leakage determination step of determining that there is a leak in the evaporative fuel processing system when a variation amount of the detected pressure detected during the secondary pressure reduction is higher than a predetermined leakage reference value.

4. A leakage determination method according to claim 3, wherein at said secondary pressure reduction step, the negative pressure from the intake system is introduced at a predetermined constant negative pressure introduction flow rate.

* * * * *